United States Patent Office 3,052,707
Patented Sept. 4, 1962

3,052,707
FUNGICIDALLY ACTIVE SULFITES
Harold F. Wilson, Moorestown, N.J., assignor to Rohm & Haas Company, Philadelphia, Pa., a corporation of Delaware
No Drawing. Filed May 18, 1959, Ser. No. 813,630
6 Claims. (Cl. 260—456)

This invention concerns chloroethyl α-cyanoalkyl sulfites, which are active fungicidal agents. It also deals with a method for the preparation of these sulfites.

Some chloroethyl sulfites have been proposed as insecticidal agents, but as far as has been determined, the sulfites previously prepared for combating insects and mites are not effective fungicides.

Novel sulfites have now been discovered which possess a high degree of activity against many kinds of fungi which attack plants. These sulfites may be assigned the formula

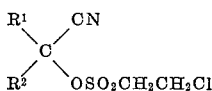

wherein $R^1$ represents hydrogen, an alkyl group of one to three carbon atoms, or a chloromethyl group, $R^2$ represents an alkyl group of one to six carbon atoms or a chloromethyl group, these values occurring when $R^1$ and $R^2$ are taken individually. When $R^1$ and $R^2$ are taken together, they form a divalent aliphatic chain of four to five atoms, particularly an alkylene group, which with the carbon carrying the cyano group forms a cycle, such as a cyclopentyl or cyclohexyl group. It will be seen that the descriptive term α-cyanoalkyl is used in the broad sense of including both open chain alkyl groups and cycloalkyl.

These chloroethyl α-cyanoalkyl sulfites are prepared by reacting together 2-chloroethyl chlorosulfinate and a cyanohydrin of the formula

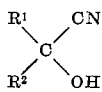

wherein $R^1$ and $R^2$ are the groups defined above. The reaction is best effected in the presence of a volatile organic solvent inert to the reactants, such as hexane, octane, or a volatile naphtha, benzene, toluene, xylene, or an aromatic naphtha, an ether, such as diisopropyl ether, dibutyl ether or diethyl ether, chloroform, carbon tetrachloride, ethylene dichloride, or other volatile chlorinated hydrocarbon liquid at temperatures of about 25° to about 150° C., which are suitable temperatures for the reaction, although both higher and lower temperatures may be used.

Hydrogen chloride is formed in the reaction and may be driven from the reaction mixture by heating. Alternatively, there may be present an acceptor for the hydrogen chloride, such as pyridine or sodium bicarbonate. The salt which forms can be separated, as by filtering. The solvent is distilled off. The product is obtained in the residue and may be purified by distillation.

The starting material 2-chloroethyl chlorosulfinate is a known substance which may readily be prepared by reacting thionyl chloride and ethylene chlorohydrin. Other chloroalkyl chlorosulfinates, such as 2- or 3-chloropropyl chlorosulfinates are similarly prepared and can be reacted with the cyanohydrins to give similar sulfites.

The cyanohydrins which provide the other necessary reactant are the cyanohydrins of aldehydes or ketones such as acetaldehyde, propionaldehyde, butyraldehyde, butyrchloral, or hexaldehyde, or acetaldehydes having one, two, or three atoms of chlorine as substituents of the methy group, as in dichloroacetaldehyde or chloral, acetone, methyl ethyl ketone, diethyl ketone, methyl butyl ketone, methyl isobutyl ketone, methyl sec-butyl ketone, methyl hexyl ketone, ethyl butyl ketone, dipropyl ketone, diisopropyl ketone, β,β'-dichloroacetone, and other ketones having chloromethyl groups, cyclopentanone, cyclohexanone, and alkylated derivatives of these.

The process for preparing the α-cyanoalkyl sulfites is illustrated by the following examples to give details of a typical preparation. Parts are by weight.

Example 1

(a) There are mixed 85 parts of acetone cyanohydrin and 500 parts of octane. The mixture is stirred and heated to reflux, the pot temperature being about 90°–110° C. There is slowly added 163 parts of 2-chloroethyl chlorosulfinate. Hydrogen chloride is evolved. It is taken up in a dilute aqueous sodium hydroxide solution in a separate vessel which is connected to the reflux condenser. After about 2½ hours the theoretical amount of hydrogen chloride has been evolved. The octane is distilled off. A forerun is taken at 55°–95° C./0.3 mm. and the desired product is obtained by distilling at 96°–97° C./0.25 mm. The distillate amounts to 150 parts. It has the correct content of chlorine, nitrogen and sulfur by analyses for the desired product, 2-chloroethyl α-cyanoisopropyl sulfite. The refractive index $n_D^{20}$, is 1.4622.

(b) There are mixed 85 parts of acetone cyanohydrin, and 500 parts of dry diethyl ether, and the temperature of the mixture is adjusted to 30° C. and held at about this temperature while there are slowly added separately with stirring 165 parts of 2-chloroethyl chlorosulfinate and 80 parts of pyridine. The mixture is then heated under reflux and stirred for six hours. It is cooled and filtered. The filtrate is washed, dried over calcium sulfate, and distilled. The main fraction consists of 160 parts of 2-chloroethyl α-cyanoisopropyl sulfite, which by analysis contains about the theoretical proportions of chlorine, nitrogen, and sulfur.

Example 2

In the same way as in Example 1(a) there are reacted acetaldehyde cyanohydrin, α-hydroxypropionitrile, 71 parts, in a naphtha with 163 parts of chloroethyl chlorosulfinate. The desired product, 2-chloroethyl α-cyanoethyl sulfite distills at 90°–94° C./0.4 mm. It has a refractive index, $n_D^{20}$, of 1.4663.

Example 3

In the same way as in Example 1(a) there are reacted α-hydroxy-β,β,β-trichloropropionitrile, 175 parts, and chloroethyl chlorosulfinate, 163 parts. The product distills at 91°–94° C./0.4 mm. It contains the correct amount of chlorine, nitrogen, and sulfur for the compound

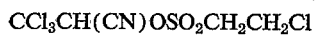

2-chloroethyl 2,2,2-trichloro-1-cyanoethyl sulfite. The refractive index at 20° C. is 1.4965.

Example 4

In the same way as in Example 3, there are reacted 2-chloroethyl chlorosulfinate and $CH_2ClC(CH_3)(OH)CN$ in an equimolar ratio. The product,

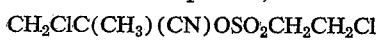

distills at 105°–113° C./0.5 mm. and has a refractive index at 20° C. of 1.4814.

Example 5

In the same way, there are reacted equimolar proportions of 2-chloroethyl chlorosulfinate and α-hydroxy-β,β'-dichloroisobutyronitrile. The product,

2-chloroethyl 2,2'-dichloro-1-cyanoisopropyl sulfite, distills at 131°–136° C./0.55 mm. and has a refractive index (20° C.) of 1.4983.

Example 6

In accordance with the above procedure there are reacted in an equimolar proportion 2-chloroethyl chlorosulfinate and methyl ethyl ketone cyanohydrin,

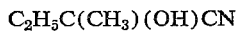
$$C_2H_5C(CH_3)(OH)CN$$

The desired product, $C_2H_5(CH_3)C(CN)OSO_2CH_2CH_2Cl$, distills at 91°–98° C./0.4 mm. and has an $n_D^{20}$ value of 1.4725.

Example 7

In place of the above cyanohydrins there is used the cyanohydrin from isobutyl methyl ketone. The product has the structure

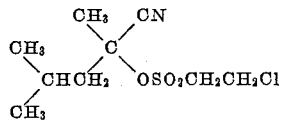

It distills at 115°–120° C./1.0 mm. and has an $n_D^{20}$ value of 1.4656.

Likewise, there are reacted methyl hexyl ketone and chloroethyl chlorosulfinate to give

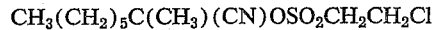
$$CH_3(CH_2)_5C(CH_3)(CN)OSO_2CH_2CH_2Cl$$

which distills at 116°–128° C./0.15 mm. and has a refractive index of 1.4630.

In the same fashion there are reacted diethyl ketone cyanohydrin and chloroethyl chlorosulfinate to give

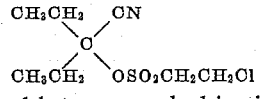

while a diisopropyl ketone cyanohydrin gives

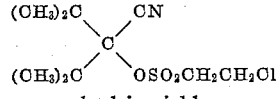

and 4-heptanone cyanohydrin yields

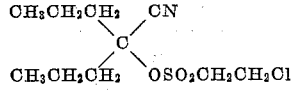

Example 8

There are reacted in about an equimolar proportion cyclohexanone cyanohydrin and 2-chloroethyl chlorosulfinate. The product has the structure

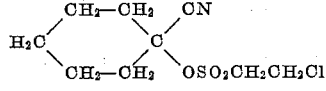

distilling at 135°–140° C./0.35, $n_D^{20}$ of 1.4900.

In the same way, cyclopentanone cyanohydrin gives a sulfite with the five-membered carbocycle.

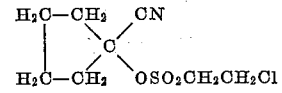

These cycles may be substituted at one or more positions, as with a lower alkyl group or groups, for instance, from 4-methylcyclohexanone cyanohydrin or 3,3,5-trimethylcyclohexanone cyanohydrin.

The sulfites having a cyano group in the α-position may be formulated in fungicidal compositions. They may be taken up in a carrier which is solid or liquid. Auxiliary agents such as dispersing, wetting, or sticking agents may be used in conjunction therewith.

Thus, one or more inert, finely particled solids may be used to take up one or more of these sulfites. Useful solids include hydrated silica, diatomaceous earth, pyrophyllite, talc, and neutral clays. A dust may be prepared with 1 to 15% of an above sulfite, 99% to 80% of one or more finely divided solids, and optionally 0.1% to 5% of a dispersing agent or of a mixture of wetting and dispersing agents.

If desired, the proportion of the sulfite and wetting agent may be increased to give a wettable powder, which may be applied in an aqueous spray. A typical formula is 25 parts of a sulfite, 60 parts of clay, 10 parts of hydrated silica, 3 parts of condensed naphthalene-formaldehyde sodium sulfonate, and 2 parts of an alkylphenoxypolyethoxyethanol wetting agent. Other dispersion agents, such as lignin sulfonates or imides of copolymers of maleic anhydride and olefinic comonomers. Also other wetting agents may be used such as other well-known non-ionic ethylene oxide condensates with long-chained alcohols, mercaptans, or carboxylic acids, or sulfated alcohols, or alkylbenzene sulfonates, or sulfosuccinates.

Solvent solutions of one or more of the sulfites may also be prepared. A typical formulation is 25 parts of one or more of the sulfites, 5 parts of an oil-soluble emulsifier, and 70 parts of solvent, such as toluene, xylene, or aromatic naphtha. The emulsifier may be a non-ionic agent, such as an alkylphenoxy-polyethoxyethanol or an ethylene oxide condensate of a long-chained fatty acid or mercaptan or alcohol.

The sulfites of this invention have been evaluated against a variety of species of fungi and found quite active fungicidally. In the standard fungitoxicity tests with coated slides (Phytopathology 33, 627 (1943)), there is determined the $LD_{50}$ value, the concentration at which inhibition of germination of 50% of the spores of the test organism is obtained. The $LD_{50}$ values obtained against *Stemphylium sarcinaeforme* and *Monolinia fructicola* vary with the particular chloroethyl α-cyanoalkyl sulfite from less than one part per million (p.p.m.) for the most active sulfite to less than 100 p.p.m. for the compounds having the maximum number of carbon atoms in the substituent. About identical $LD_{50}$ values are obtained with either of the above-noted fungi.

For sulfites derived from methyl butyl ketone cyanohydrins or methyl hexyl ketone cyanohydrins there are obtained $LD_{50}$ values of 10 to 50 p.p.m. The sulfite derived from methyl ethyl ketone or diethyl ketone cyanohydrins give $LD_{50}$ values of 5 to 10. The compounds prepared in Examples 1, 3, 4, and 5 give $LD_{50}$ values of 5 p.p.m. or less. β-Chloroethyl α-cyanoethyl sulfite gives surprising values of less than one p.p.m.

In comparison and contrast with the above values there may be noted values of over 1000 obtained with 2-chloroethyl-p-chlorophenoxypropyl sulfite, as typical compounds of the prior art. Such values are too poor to allow these sulfites to be even considered as fungicides.

The sulfites of this invention show considerable activity against fungi which are found in soils. Tests against such fungi were made according to the method of Zentmyer (Phytopathology 45, 398), in which an inoculum disk is placed at a depth of one inch in a glass vial containing two inches of autoclaved soil, the chemical under test is supplied at a determined dilution at the top of the vial, and after 24 hours the inoculum is recovered and examined for viability.

Typical results are those obtained with 2-chloroethyl α-cyanoisopropyl sulfite. At 10 p.p.m. it inhibited germination of spores of *Armillaria mellea* (oak root fungus), *Phytophthora cinnamoni* (a root rot of avocados and ornamentals), *Pythium ultimum* (a damping-off fungus), and *Sclerotinia sclerotiorum* (a root rot fungus). At 100 p.p.m. inhibition was obtained of germination of spores of *Phytophthora cactorum* (a crown rot fungus) and *Sclerotium rolfsii* (southern root rot fungus).

The sulfites of this invention may have some action against some pests which are found on or about plants, but they do not appear as outstanding for such purposes as for controlling fungi on foliage or other plant organs.

The sulfites of this invention may be mixed with and/or applied to plants with one or more other pesticidal agents which are chemically unreactive with an organic sulfite. The added agent may be another fungicide, a miticide, or an insecticide. For example, the sulfites of this invention may be used in conjunction with bis(chlorophenyl)trichloroethane, bis(chlorophenyl)dichloroethane, 2-chloroethyl tert-butylphenoxypropyl sulfite, or the like.

I claim.

1. Sulfites of the structure

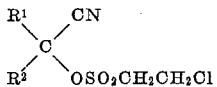

wherein when $R^1$ is taken individually, it is a member of the class consisting of hydrogen, alkyl groups of one to three carbon atoms, and chloromethyl groups, when $R^2$ is taken individually, it is a member of the class consisting of chloromethyl groups and alkyl groups of one to six carbon atoms, and when $R^1$ and $R^2$ are taken together, they form an alkylene chain which with the carbon atom carrying the —CN group forms a carbocycle of five to six carbon atoms.

2. 2-chloroethyl α-cyanoisophopyl sulfite.
3. 2-chloroethyl α-cyanoethyl sulfite.
4. 2-chloroethyl 2,2′-dichloro-1-cyanoisopropyl sulfite.
5. 2-chloroethyl 2,2,2-trichloro-1-cyanoethyl sulfite.
6. 2-chloroethyl 1-cynocyclohexyl sulfite.

References Cited in the file of this patent

UNITED STATES PATENTS

| | | |
|---|---|---|
| 2,344,105 | Peters | Mar. 14, 1944 |
| 2,404,717 | Houtz | July 23, 1946 |
| 2,529,493 | Harris et al. | Nov. 14, 1950 |
| 2,665,293 | Johnson et al. | Jan. 5, 1954 |
| 2,671,105 | Sprague et al. | Mar. 2, 1954 |
| 2,819,211 | Mikeska et al. | Jan. 7, 1958 |
| 2,820,808 | Harris et al. | Jan. 21, 1958 |
| 2,833,587 | Craig et al. | May 6, 1958 |
| 2,840,501 | Meuli | June 24, 1958 |